(12) United States Patent
Jeon et al.

(10) Patent No.: US 10,476,622 B2
(45) Date of Patent: Nov. 12, 2019

(54) SYNCHRONIZATION SIGNALS FOR LICENSE ASSISTED ACCESS

(71) Applicant: Intel IP Corporation, Santa Clara, CA (US)

(72) Inventors: Jeongho Jeon, San Jose, CA (US); Hwan-Joon Kwon, Portland, OR (US); Qiaoyang Ye, San Jose, CA (US); Abhijeet Bhorkar, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/771,868

(22) PCT Filed: Dec. 23, 2015

(86) PCT No.: PCT/US2015/000299
§ 371 (c)(1),
(2) Date: Apr. 27, 2018

(87) PCT Pub. No.: WO2017/078656
PCT Pub. Date: May 11, 2017

(65) Prior Publication Data
US 2018/0316453 A1    Nov. 1, 2018

Related U.S. Application Data

(60) Provisional application No. 62/251,622, filed on Nov. 5, 2015, provisional application No. 62/252,364, filed on Nov. 6, 2015.

(51) Int. Cl.
*H04J 11/00* (2006.01)
*H04W 56/00* (2009.01)
(Continued)

(52) U.S. Cl.
CPC ....... *H04J 11/0073* (2013.01); *H04J 11/0076* (2013.01); *H04W 16/14* (2013.01); *H04W 56/0015* (2013.01); *H04W 72/0446* (2013.01)

(58) Field of Classification Search
CPC .. H04J 11/0073; H04J 11/0076; H04W 16/14; H04W 56/0015; H04W 72/0446
See application file for complete search history.

(56) References Cited

U.S. PATENT DOCUMENTS

2013/0142062 A1* 6/2013 Dinan ............... H04W 24/00
370/252
2014/0050206 A1* 2/2014 Seo ............... H04J 11/0069
370/336
(Continued)

FOREIGN PATENT DOCUMENTS

| CN | 108141296 | 6/2018 |
|---|---|---|
| KR | 1020150072359 A | 6/2015 |
| WO | WO-2013162185 A1 | 10/2013 |

OTHER PUBLICATIONS

IP.com patent search; Jun. 21, 2019 (Year: 2019).*
(Continued)

*Primary Examiner* — Benjamin H Elliot, IV
(74) *Attorney, Agent, or Firm* — Schwegman Lundberg & Woessner, P.A.

(57) ABSTRACT

Systems, apparatus, user equipment (UE), evolved node B (eNB), computer readable media, and methods are described for license assisted access (LAA) communications on an unlicensed channel. The eNB determines if a subframe to be transmitted is a partial subframe, and if the subframe is not a partial subframe, constructs the subframe to contain both a primary synchronization signal (PSS) and a secondary synchronization signal (SSS) at fixed symbol positions within the subframe. In further embodiments, the eNB determines if a last subframe of a downlink (DL) transmis-
(Continued)

sion burst to be transmitted is a partial subframe, and if the subframe is not a partial subframe, constructs the subframe to contain a discovery reference signal (DRS) for transmission.

25 Claims, 10 Drawing Sheets

(51) Int. Cl.
*H04W 16/14* (2009.01)
*H04W 72/04* (2009.01)

(56) References Cited

U.S. PATENT DOCUMENTS

| | | | | |
|---|---|---|---|---|
| 2014/0301336 | A1* | 10/2014 | Kim | H04L 5/001 370/329 |
| 2015/0146713 | A1* | 5/2015 | Yang | H04W 56/0015 370/350 |
| 2015/0319724 | A1* | 11/2015 | Chae | H04W 8/005 370/315 |
| 2015/0358997 | A1* | 12/2015 | Yang | H04W 72/12 370/329 |
| 2015/0373694 | A1* | 12/2015 | You | H04L 5/0051 370/329 |
| 2016/0142241 | A1* | 5/2016 | Sahlin | H04L 27/2656 370/329 |
| 2016/0315752 | A1* | 10/2016 | Chen | H04L 5/005 |
| 2017/0027013 | A1* | 1/2017 | Kim | H04W 72/04 |
| 2017/0111888 | A1* | 4/2017 | Dinan | H04W 72/042 |
| 2017/0142743 | A1* | 5/2017 | Yoon | H04L 5/0048 |
| 2017/0142751 | A1* | 5/2017 | Liu | H04L 5/1415 |
| 2017/0164384 | A1* | 6/2017 | Wang | H04W 72/1289 |
| 2017/0238311 | A1* | 8/2017 | Hooli | H04W 74/0816 370/329 |
| 2017/0289818 | A1* | 10/2017 | Ng | H04W 48/12 |
| 2018/0132209 | A1* | 5/2018 | Shimezawa | H04J 11/00 |
| 2018/0132271 | A1* | 5/2018 | Jung | H04W 16/14 |
| 2018/0206129 | A1* | 7/2018 | Choi | H04L 1/00 |
| 2018/0249467 | A1* | 8/2018 | Zheng | H04L 27/2607 |
| 2018/0310294 | A1* | 10/2018 | Goto | H04J 11/00 |
| 2018/0316453 | A1* | 11/2018 | Jeon | H04W 56/0015 |
| 2018/0323923 | A1* | 11/2018 | Wang | H04L 5/0053 |

OTHER PUBLICATIONS

IP.com NPL search; Jun. 21, 2019 (Year: 2019).*
R1-155068 UE support of carrier selection for LAK; 3GPP TSG RAN WG1 Meeting #82bis; Malmo, Sweden; Oct. 5-9, 2015 (Year: 2015).*
R1-155103 "Candidate starting/ending positions of partial subframe and corresponding indication for LAA"; 3GPP TSG RAN WG1 Meeting #82bis; Malmo, Sweden; Oct. 5-9, 2015 (Year: 2015).*
"International Application Serial No. PCT US2015 000299, International Preliminary Report on Patentability dated May 17, 2018", 8 pgs.
"3GPP; TSG RAN", Study on Licensed-Assisted Access to Unlicensed Spectrum (Release 13)', 3GPP TR 36.889 V1.0.0, (Jun. 4, 2015).
"International Application Serial No. PCT/US2015/000299, International Search Report dated Jul. 28, 2016", 3 pgs.
"International Application Serial No. PCT/US2015/000299, Written Opinion dated Jul. 28, 2016", 6 pgs.

* cited by examiner

SYNCHRONIZATION SIGNALS FOR LICENSE ASSISTED ACCESS

PRIORITY CLAIM

This application is a U.S. National Stage Filing under 35 U.S.C. 371 from International Application No. PCT/US2015/000299, filed Dec. 23, 2015 and published in English as WO 2017/078656 on May 11, 2017, which claims the benefit of priority to U.S. Provisional Patent Application Ser. No. 62/251,622 filed on Nov. 5, 2015, and entitled "CONSTRUCTING SUBFRAMES CONTAINING SYNCHRONIZATION SIGNALS IN LICENSED ASSISTED ACCESS", and to U.S. Provisional Patent Application Ser. No. 62/252,346 filed on Nov. 6, 2015, and entitled "DRS TRANSMISSION IN THE LAST SUBFRAME OF AN LAA DL TRANSMILLSION BURST" each of which is incorporated herein by reference in its entirety.

TECHNICAL FIELD

Embodiments pertain to systems, methods, and component devices for wireless communications, and particularly to the generation and use of synchronization signals for license assisted access to unlicensed frequencies for long term evolution (LTE), LTE-advanced, and other similar wireless communication systems.

BACKGROUND

Due to the increasing demand for high data rates over wireless, there has been an accompanying increased interest in operation of LTE system in unlicensed frequency bands. The unlicensed frequency band of current interest in 3GPP is the 5 GHz band, which has wide spectrum with global common availability. The 5 GHz band is governed by Federal Communications Commission (FCC) in US and European Telecommunications Standards Institute (ETSI) in Europe. The main incumbent system in the 5 GHz band is the Wireless Local Area Networks (WLAN), specifically those based on the IEEE 802.11 a/n/ac technologies. Since WLAN systems are widely deployed both by individuals and operators for carrier-grade access service and data offloading, sufficient care must be taken before deployment to ensure co-existence.

DETAILED DESCRIPTION

Embodiments relate to systems, devices, apparatus, assemblies, methods, and computer readable media to enhance wireless communications, and particularly to provide synchronization signals and discovery reference signals in license assisted access. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

An overview of a cellular communication architecture is first described, followed by a description of how synchronization signals are inserted into frames that are transmitted to help utilize an unlicensed frequency. Transmission of a discovery reference signal is also described, and further detail is provided regarding devices that perform the above transmissions.

Figure 1:
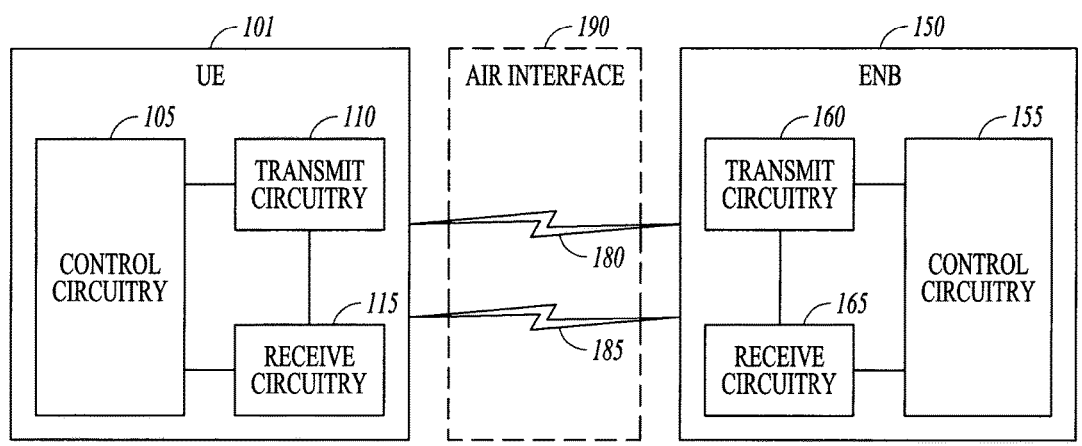
FIG. 1 is a block diagram of a system including an evolved node B (eNB) and user equipment (UE) that may operate according to some embodiments described herein.

FIG. 1 illustrates a wireless network 100, in accordance with some embodiments. The wireless network 100 includes a UE 101 and an eNB 150 connected via an air interface 190. UE 101 and eNB 150 communicate using a system that supports carrier aggregation, such that air interface 190 supports multiple frequency carriers, shown as component carrier 180 and component carrier 185. Although two component carriers are illustrated, various embodiments may include any number of two or more component carriers.

Additionally, in various embodiments described herein, at least one of the carriers of air interface 190 comprises a carrier operating in an unlicensed frequency, referred to herein as an unlicensed carrier. An unlicensed carrier or unlicensed frequency refers to system operation in a range of radio frequencies that are not exclusively set aside for the use of the system. Some frequency ranges, for example, may be used by communication systems operating under different communication standards, such as a frequency band that is used by both Institute of Electronic and Electrical Engineers (IEEE) 802.11 standards (e.g. "WiFi") and third generation partnership (3GPP) standards. By contrast, a licensed channel or licensed spectrum operates under a particular system, with limited concern that other unexpected signals operating on different standard configurations will be present.

As discussed below, when a system operates in an unlicensed spectrum, rules and operations for verifying that the unlicensed channels are available provide additional overhead and system operational elements that are not present in licensed channels. The sharing of a channel may be referred to as fair coexistence, where different systems operate to use an unlicensed or shared channel while limiting both interference and direct integration with the other systems operating on different standards.

Long term evolution (LTE) cellular communications, for example, historically operate with a centrally managed system designed to operate in a licensed spectrum for efficient resource usage. Operating with such centrally managed use within unlicensed channels where systems not centrally controlled that use different channel access mechanisms than legacy LTE may be present carries significant risk of direct interference. The inclusion of synchronization signals and discovery reference signals described herein enable LTE, LTE-advanced, and communications systems building on or similar to LTE systems to coexist with other technologies such as WiFi in shared unlicensed frequency bands (e.g. unlicensed channels.)

Embodiments described herein for coexistence may operate within the wireless network 100. In wireless network 100, the UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The eNB 150 provides the UE 101 network connectivity to a broader network (not shown). This UE 101 connectivity is provided via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150.

The UE 101 includes control circuitry 105 coupled with transmit circuitry 110 and receive circuitry 115, described in greater detail below with respect to FIG. 16. The transmit circuitry 110 and receive circuitry 115 may each be coupled with one or more antennas. The control circuitry 105 may be adapted to perform operations associated with wireless communications using carrier aggregation. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to FDM. The transmit circuitry 110 and the receive circuitry 115 may transmit and receive both control data and content data (e.g. messages, images, video, et cetera) structured within data blocks that are carried by the physical channels.

FIG. 1 also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations for managing channels and component carriers used with various UEs. The transmit circuitry 160 and receive circuitry 165 may be adapted to transmit and receive data, respectively, to any UE connected to eNB 150. The transmit circuitry 160 may transmit downlink physical channels comprised of a plurality of downlink subframes. The receive circuitry 165 may receive a plurality of uplink physical channels from various UEs including UE 101. The plurality of uplink physical channels may be multiplexed according to FDM in addition to the use of carrier aggregation.

As mentioned above, the communications across air interface 190 may use carrier aggregation, where multiple different component carriers 180, 185 can be aggregated to carry information between UE 101 and eNB 150. Such component carriers 180, 185 may have different bandwidths, and may be used for uplink communications from UE 101 to eNB 150, downlink communications from eNB 150 to UE 101, or both. Such component carriers 180, 185 may cover similar areas, or may cover different but overlapping sectors. The radio resource control (RRC) connection is handled by only one of the component carrier cells, which may be referred to as the primary component carrier, with the other component carriers referred to as secondary component carriers. In some embodiments, the primary component carrier may be operating in a licensed band to provide efficient and conflict-free communications. This primary channel may be used for scheduling other channels including unlicensed channels as described below.

Downlink synchronization signals are intended to facilitate the cell search by UEs, during which the UEs can also acquire the time and frequency synchronization with the eNB sending the synchronization signals. Once a primary synchronization signal (PSS) of a cell is detected, the UE acquires the symbol timing and a cell ID index. Upon the detection of a secondary synchronization signal (SSS), the UE can also acquire a cell ID group and frame timing. In legacy LTE systems operating over the licensed spectrum, the synchronization signals are transmitted by the eNB in subframes #0 and #5 in a repeated manner in every frame.

Indexed subframes transmitted over unlicensed component carriers should convey the synchronization signals, e.g., subframes #0 and #5 in every frame as in the licensed carriers. However, a license assisted access (LAA) subframe transmitted over an unlicensed component carrier can be partial, which may preclude the use of a particular subframe for a synchronization signal. For instance, the first subframe of an LAA downlink (DL) transmission burst can be partial because a listen before talk (LBT) procedure can finish any time between the subframe boundaries. The last subframe of a DL transmission burst can also be partial if the burst needs to be shortened according to a maximum channel occupancy time (MCOT) limit.

Various embodiments are described that construct subframes that contain the synchronization signals PSS/SSS given that a subframe can be partial. The embodiments are applicable to any form of partial subframe that needs to convey synchronization signals.

In one embodiment, the synchronization signals PSS/SSS are transmitted in regular subframes and not in partial subframes. In a further embodiment, PSS/SSS in partial subframes may be constructed and transmitted as long as the subframe can accommodate the synchronization signals PSS/SSS.

In legacy LTE systems, two synchronization signals, PSS/SSS, are transmitted on each licensed downlink (DL) component carrier to facilitate the cell search and time/frequency synchronization.

Figure 2:
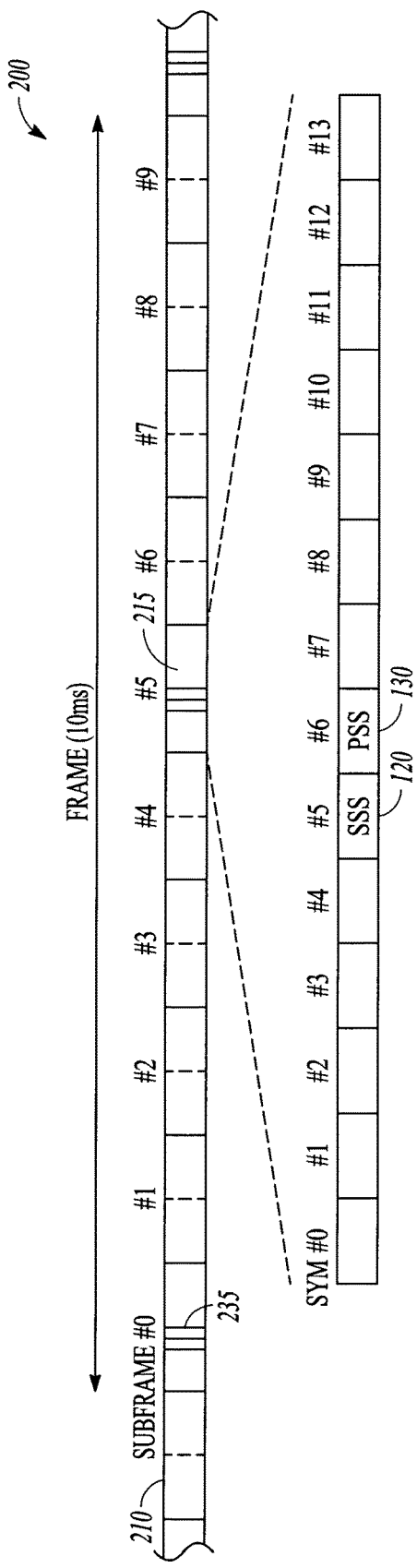
FIG. 2 is a timing diagram illustrating positions of synchronization symbols in subframes according to an example embodiment.

FIG. 2 is a timing diagram illustrating synchronization signals being transmitted in regular subframes, generally at 200. A frame consists of subframes 0 through 9 indicated at 210. Subframe 5 at 215 is illustrated in further detail at 220. Each subframe contains fourteen symbols numbered #0 through #13 as shown at 220. A symbol #5 at 225 contains synchronization signal SSS. A symbol #6 at 230 contains synchronization signal PSS. Note that the synchronization signals occur in subframes 5 as indicated at 215 and in subframe 0 as indicated at 235 on each licensed downlink (DL) component carrier to facilitate the cell search and time/frequency synchronization. When a regular subframe is available, the synchronization signals occur in the same positions as in a licensed carrier. The synchronization signals are transmitted at such symbols in every frame in the FDD case with normal CP.

Once a UE has detected and identified the PSS of a cell, it finds the five-millisecond timing of the cell and the cell identity within the cell-identity group. The PSS can take three different values depending on the physical-layer cell identity. It is a length-63 Zadoff-Chu sequence extended with five zeros at the edges and is mapped to the center 73 subcarriers including the DC subcarrier, where the element in the PSS sequence corresponding to the DC subcarrier is set to be 0.

Once a UE has detected and identified the SSS of a cell, it finds frame timing and the cell-identity group among 168 alternatives. Similar to PSS, SSS occupies the center 73 subcarriers including the DC subcarrier. The SSS transmitted at subframe #0 at 235 is based on the interleaving of two length-31 m-sequences. The SSS transmitted at subframe #5 is based on the exactly the same two length-31 m-sequences but the two sequences are swapped in the frequency domain.

In an LAA system, a subframe can be incomplete and partial. This is mainly because the LBT can finish any time in between the subframe boundaries and the eNB may want to grab the channel immediately before losing the chance to transmit. Therefore, the first subframe of a DL transmission burst can be partial. If necessary, the last subframe of a DL transmission burst can be shortened and, thus, partial, due to the maximum channel occupancy time (MCOT) limit.

Several embodiments are described that construct subframes that contain PSS/SSS given that a subframe can be partial. In transmitting the synchronization signals over unlicensed carrier, it may be assumed that PSS/SSS are transmitted at subframes #0 and #5 in every frame as in the licensed carrier. However, embodiments are not subject to a particular synchronization signal transmission scheme. Embodiments are applicable to any partial subframe that needs to transmit synchronization signals.

In one embodiment, synchronization signals, PSS/SSS, are transmitted in the regular subframes when they are scheduled to be transmitted, e.g., every #0 and #5 subframes in a frame as shown at 200 in FIG. 2. The rationale behind this embodiment is to best utilize partial subframe resources for data transmission. Given the control overhead such as physical downlink control channel (PDCCH) and other reference signals, the insertion of PSS/SSS into partial subframes would further limit the available resources for data transmission. Furthermore, given the aids from eNB through licensed primary carrier, UEs are not solely relying on the acquisition of PSS/SSS on the unlicensed secondary carriers for cell identification and synchronization.

Figure 3:
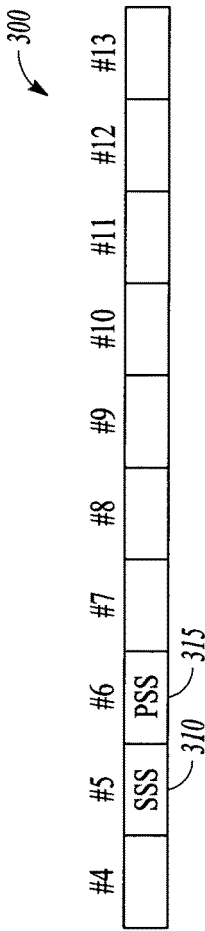
FIG. 3 is a timing diagram illustrating positions of synchronization symbols in a partial subframe according to an example embodiment.

FIG. 3 is a timing diagram illustrating transmission of the synchronization signals in partial subframes 300. The synchronization signals PSS/SSS are transmitted as long as they can fit into the partial subframe. Subframe 300 in this case includes symbols #4 through #13. It is partial because it lacks symbols #0 through #3.

The first subframe of a DL burst is now described, followed by a description of the last subframe of a DL burst. Note that any subframe, which is not the first, last, or first and last subframe (in the case when a DL burst contains only one subframe), is a regular subframe having 1 ms transmission time interval (TTI). Thus, those intermediate subframes are not subject to the issue of inserting PSS/SSS or not.

The first subframe may be a partial subframe. As noted earlier, the LBT procedure to acquire the right on channel access can finish any time in between the subframe boundaries. Accordingly, a DL transmission burst can start with a partial subframe. $S_s$ is used to denote a set of possible starting positions of a DL transmission burst, or equivalently the first subframe of the DL transmission burst, in terms of the symbol positions within a subframe. The set $S_s$ can be any subset of all the possible starting symbol positions within a subframe which is given by $S_{tot}=\{n, 0 \leq n \leq 13\}$. The basic principle of this embodiment is that PSS/SSS will be transmitted as long as they can fit into the partial first subframe, which is illustrated at 300, where n is 4, and the synchronization signals can occur in symbols #5 and #6 as illustrated at 310 and 315 respectively.

Figure 4:
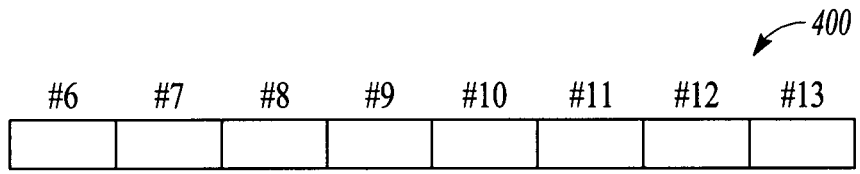
FIG. 4 is a timing diagram illustrating the absence of synchronization symbols in a partial subframe according to an example embodiment.

In one embodiment, PSS and SSS should be transmitted together if they are scheduled to be transmitted. Thus, if the first subframe starts at symbol #5 or earlier, the subframe will contain both PSS and SSS since both symbols #5 and #6 will occur in the subframe transmission. However, if the first subframe starts at symbol #6 or later as seem at 400 in FIG. 4, then the subframe does not contain either PSS or SSS.

Figure 5:
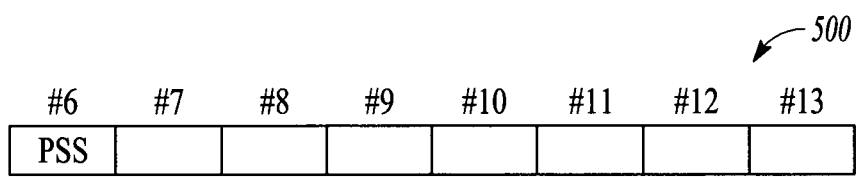
FIG. 5 is a timing diagram illustrating a position of one synchronization symbol in a partial subframe according to an example embodiment.

In another embodiment, transmission of PSS is permitted without transmission of SSS as indicated at 500 in FIG. 5 where the first subframe starts with symbol #6. Thus, if the first subframe starts at symbol #6, then only PSS will be transmitted without SSS.

The basic principle described as embodiments above applies to any $S_s$, which is a subset of $S_{tot}$. In one example, the starting position are limited to slot boundaries (i.e.

$S_S=\{0,7\}$). If the first subframe starts at symbol #0, then it is a regular subframe and there is no issue. In other words, if the first subframe is supposed to convey PSS/SSS, e.g., every #0 and #5 subframes in a frame, then it will convey PSS/SSS.

If the first subframe starts at symbol #7, this partial subframe cannot accommodate PSS/SSS which possess symbol #5 and #6 as shown in FIG. 2 at 225, 230. Thus, regardless of whether this first subframe is supposed to convey PSS/SSS, it will not convey PSS/SSS.

In a second example, no limit on the starting position (i.e., $S_S=S_{tot}$). If the first subframe starts at symbol #5 or earlier, then it contains both PSS and SSS, if synchronization signals are supposed to be transmitted in that subframe. If the first subframe starts at symbol #6, the symbol #6 may or may not contain PSS depending on whether the policy enforces that PSS and SSS must be transmitted together or not. If the first subframe starts at symbol #7 or later, then it does it contains neither PSS nor SSS regardless of whether the synchronization signals are supposed to be transmitted in that subframe or not.

Figure 6:
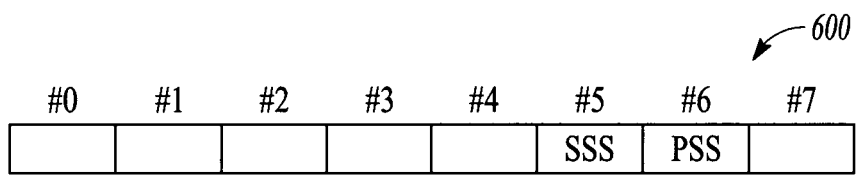
FIG. 6 is a timing diagram illustrating positions of synchronization symbols in a partial subframe according to an example embodiment.

The last subframe of a DL transmission burst can be shortened and, thus, partial, due to the MCOT limit. $S_e$ is used to denote the set of possible ending positions of a DL transmission burst, or equivalently the last subframe of the DL transmission burst, in terms of the symbol positions within a subframe. The set $S_e$ can be any subset of $S_{tot}$. The basic principle of this embodiment is that PSS/SSS will be transmitted as long as they can fit into the partial last subframe, which is illustrated at 600 in FIG. 6, where a subframe consists of symbols #0 through #7.

Figure 7:
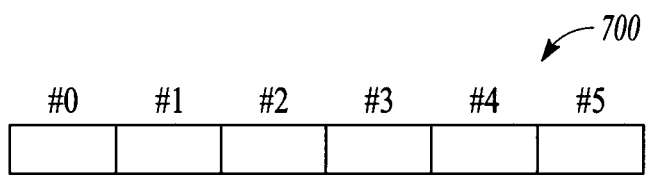
FIG. 7 is a timing diagram illustrating the absence of synchronization symbols in a partial subframe according to an example embodiment.

In one embodiment, PSS and SSS should be transmitted together if they are scheduled to be transmitted. Thus, if the last subframe ends at symbol #6 or later, then the subframe will contain both PSS and SSS. On the other hand, if the last subframe ends at symbol #5 or earlier, then the subframe does not contain both PSS and SSS, which is illustrated at 700 in FIG. 7 where the subframe contains symbols #0 through #5. Since symbol #6, where PSS would normally be transmitted is not included, neither synchronization signal is transmitted.

Figure 8:
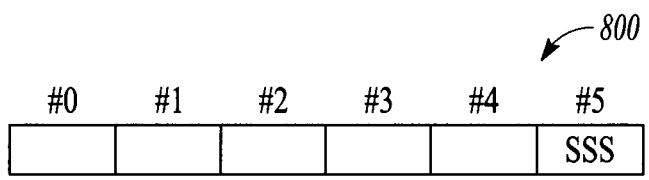
FIG. 8 is a timing diagram illustrating a position of one synchronization symbol in a partial subframe according to an example embodiment.

In another embodiment, SSS can be transmitted without PSS. Thus, if the last subframe ends at symbol #5 as indicated at 800 in FIG. 8, then only SSS will be transmitted without PSS.

The basic principle applies to any $S_e$, which is a subset of $S_{tot}$. In one example, the ending position is limited according to a downlink pilot time slot (DwPTS) configuration (i.e., $S_e=\{2,5,8,9,10,11\}$). If the last subframe ends at symbol #2, then this partial subframe cannot accommodate any PSS/SSS regardless of whether this subframe is supposed to convey PSS/SSS. If the last subframe ends at symbol #5, the symbol #5 may or may not contain SSS depending on whether the policy enforces that PSS and SSS are transmitted together or not. If the last subframe ends at symbol #8, #9, #10, or #11, then this partial subframe contains both PSS and SSS, if synchronization signals are supposed to be transmitted in that subframe.

Figure 9:
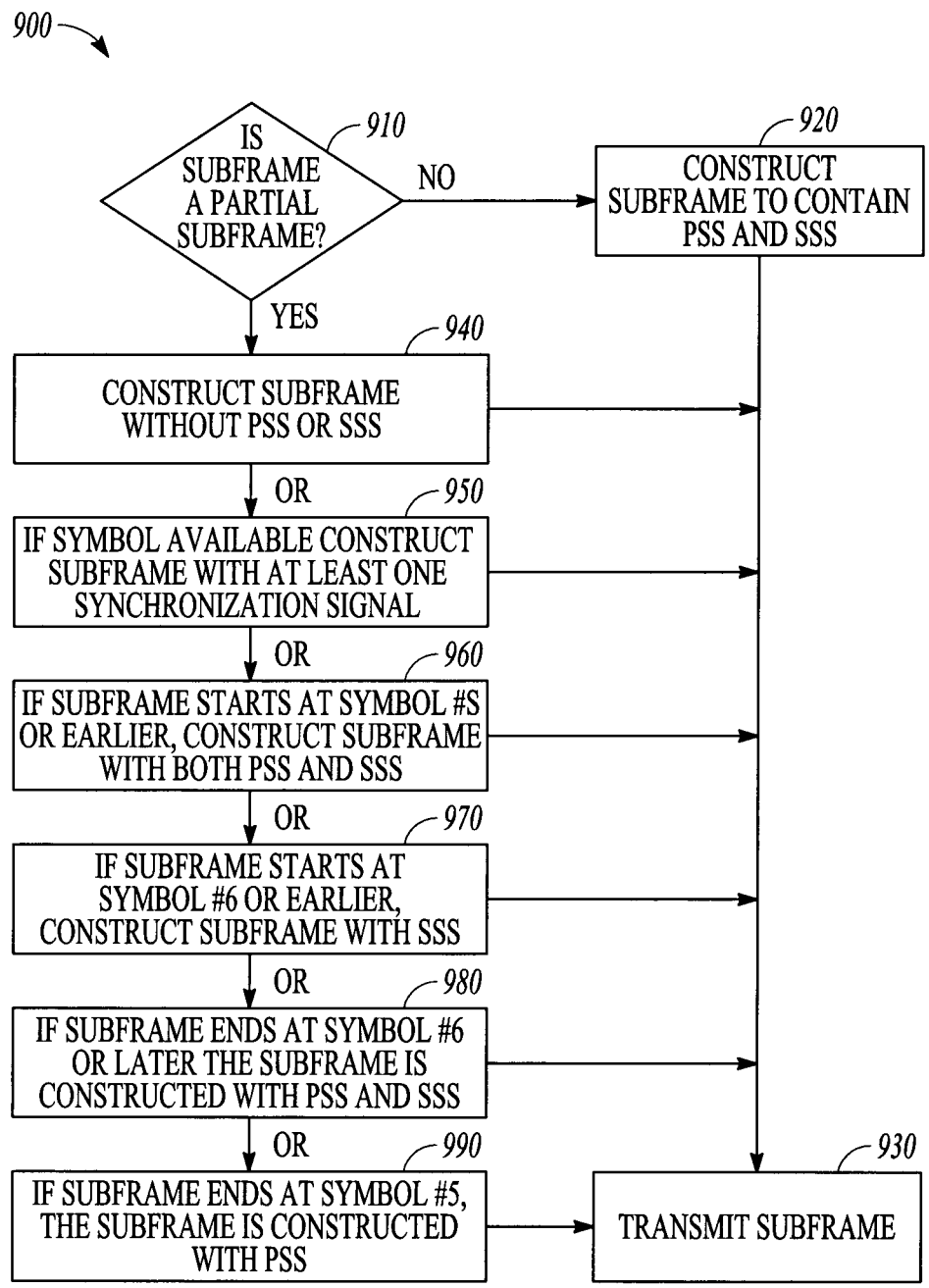
FIG. 9 is a flowchart illustrating a method of construction of subframes having synchronization symbols according to an example embodiment.

FIG. 9 is a flowchart illustrating a method 900 performed by an evolved node B (eNB) for license assisted access (LAA) communications. The method determines at 1610 if a subframe to be transmitted is a partial subframe. At 920, if the subframe is not a partial subframe, the subframe is constructed to contain both a primary synchronization signal (PSS) and a secondary synchronization signal (SSS) at fixed symbol positions within the subframe. The subframe may then be transmitted at 930.

If the subframe is a partial subframe, the subframe is constructed at 940 without the synchronization signals and may be transmitted at 930. A subframe in one embodiment comprises fourteen symbols identified as symbols #0 to #13 and wherein the primary synchronization signal has a fixed position at symbol #5 and the secondary synchronization signal has a fixed position at symbol #6, and wherein the synchronization signals are transmitted in subframes 0 and 5 of a frame.

If the subframe to be transmitted is a partial subframe, the eNB constructs the subframe at 950 to contain at least one synchronization signal as a function of whether or not a corresponding symbol is available in the partial subframe.

In one embodiment, the primary synchronization signal has a fixed position at symbol #5 and the secondary synchronization signal has a fixed position at symbol #6. If a subframe starts at symbol #5 or earlier, the subframe is constructed at 960 with both synchronization signals. If a subframe starts at symbol #6 or earlier, the subframe is constructed at 970 with the secondary synchronization signal. If a subframe ends at symbol #6 or later, the subframe is constructed with both synchronization signals at 980. If a subframe ends at symbol #5 the subframe is constructed with the primary synchronization signal at 990.

In one embodiment, a discovery reference signal (DRS) transmission occurs in the last subframe of a DL burst. It is desired that the starting of the transmission for DL burst is aligned with the PCell subframe boundary, as the Release-12 carrier aggregation mechanism mandates aligned transmission over PCell and SCell. On the other hand, an LBT can finish any time in between PCell subframe boundaries. If such PCell subframe boundary alignment restriction is enforced, the interval from the end of the successful LBT to the start of the following PCell subframe boundary would be wasted, as no data is transmitted by the eNB during this interval. To improve the resource utilization efficiency with this regard, the notion of partial subframes has been introduced in the LAA system, whose transmission time interval (TTI) is less than 1 ms. The first subframe of a DL transmission burst can be partial, as LBT can finish any time in between the subframe boundaries. The last subframe of a DL transmission burst can also be partial if the burst needs to be shortened according to the maximum channel occupancy time (MCOT) limit.

In legacy LTE systems, if a small cell is considered as the secondary cell (SCell) by all UEs served by it, this small cell may perform state transition between ON/OFF. The Rel-12 discovery reference signal (DRS) was designed to facilitate fast transition from OFF state to ON state, by transmitting minimal signals for radio response measurement (RRM) measurement and report during OFF state. A DRS consists of a primary synchronization signal (PSS), secondary synchronization signal (SSS), cell-specific reference signal (CRS) and optionally the channel state information reference signal (CSI-RS). DRS measurement timing configuration (DMTC) is configured by eNB, which has occasion of 6 ms and periodicity of 40 ms, 80 ms or 160 ms. The UEs expect DRS to be received only within DMTC. Similarly, DRS is introduced to LAA systems and potentially to standalone LTE systems in the unlicensed spectrum for RRM measurement. It has been agreed in RAN1-82bis meeting that the DRS occasion duration is 12 symbols in LAA systems.

When DMTC and DL transmission burst overlap with each other, the DRS can be transmitted within the DL transmission burst. However, if a DMTC starts at the last subframe of a DL transmission burst, the decision on the transmission of DRS is not straightforward as the last subframe might be a partial subframe and the following appended DRS transmission may be subject to the MCOT limit. Various embodiments include methods for DRS transmission when DMTC starts at the last subframe of a DL transmission burst in an unlicensed spectrum.

The DRS transmission methods for the case where the DMTC starts at the last subframe of a DL transmission burst are categorized into the following two examples. In a first example, when the last subframe of a DL transmission burst is normal whose TTI is 1 ms, the DRS is transmitted in the last subframe. In a second example when the last subframe of a DL transmission burst is partial whose TTI is less than 1 ms, the following options can be considered. Either the DRS will not be transmitted, or the DRS will be transmitted if the length of the last subframe is at least 12 OFDM symbols. The DRS will be transmitted without regard to the length of the last subframe.

The DRS transmission in some embodiments occurs where the DMTC starts at the last subframe of a DL transmission burst. DRS transmission methods can be categorized into the following two examples based on the length of the last subframe.

Figure 10:
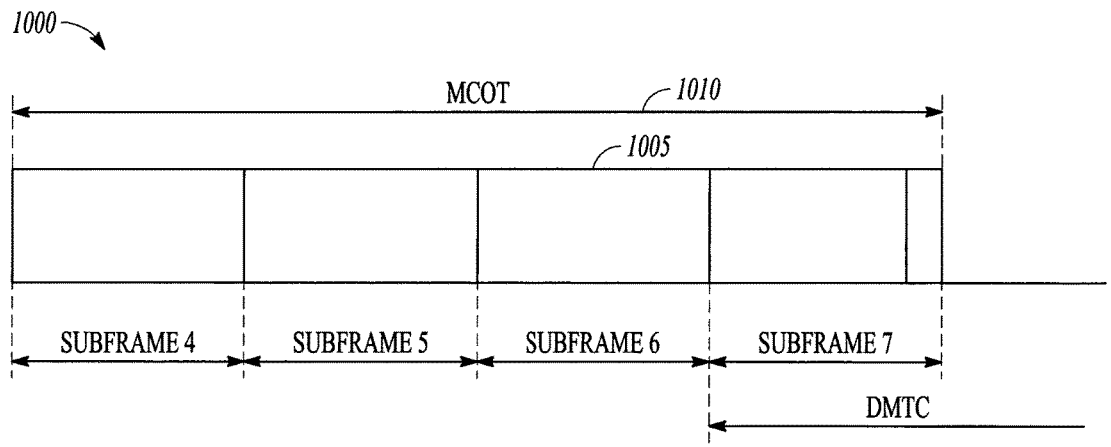
FIG. 10 is a timing diagram illustrating inclusion of a discovery reference signal in a downlink transmission according to an example embodiment.

In a first example, FIG. 10 is a timing diagram illustrating a DL transmission at 1000. The last subframe of the DL transmission burst 1000 is normal whose TTI is 1 ms. In this example, the DRS will be transmitted in the last subframe 1005 of the DL transmission burst 1000 with no predicament. MCOT 1010 is set to be 4 ms as an illustrative example.

Figure 11:
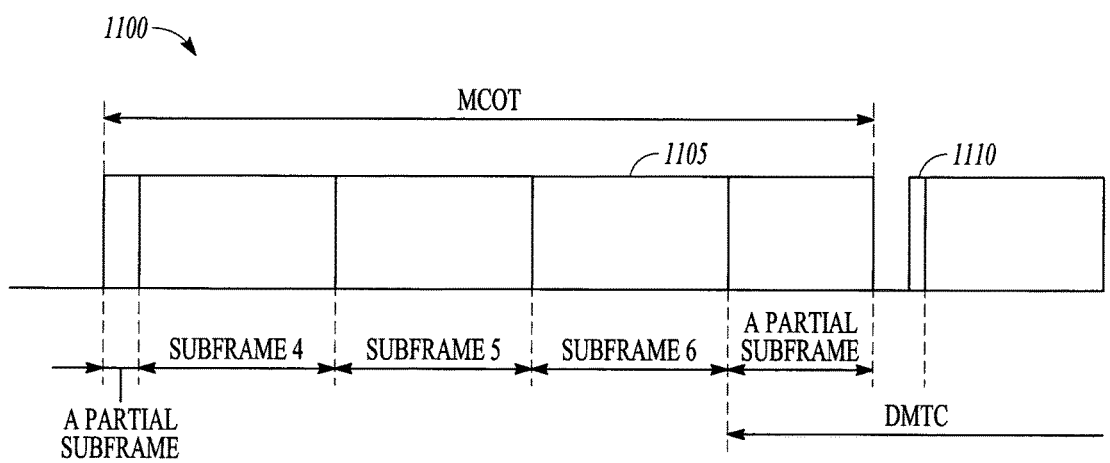
FIG. 11 is a timing diagram illustrating inclusion of a discovery reference signal in a partial subframe according to an example embodiment.

In a second example, FIG. 11 is a timing diagram illustrating a DL transmission at 1100. The last subframe 1105 of a DL transmission burst 1100 is partial whose TTI is less than 1 ms. The following methods may be used. In one method, the DRS will not be transmitted in the last subframe. In this option, a new LBT 1110 may be performed before the DRS transmission. The potential locations of DRS transmission are the subframes within DMTC other than the last subframe of the DL transmission burst. Similar to FIG. 10, MCOT 1115 is set to be 4 ms as an illustrative example.

Figure 12:
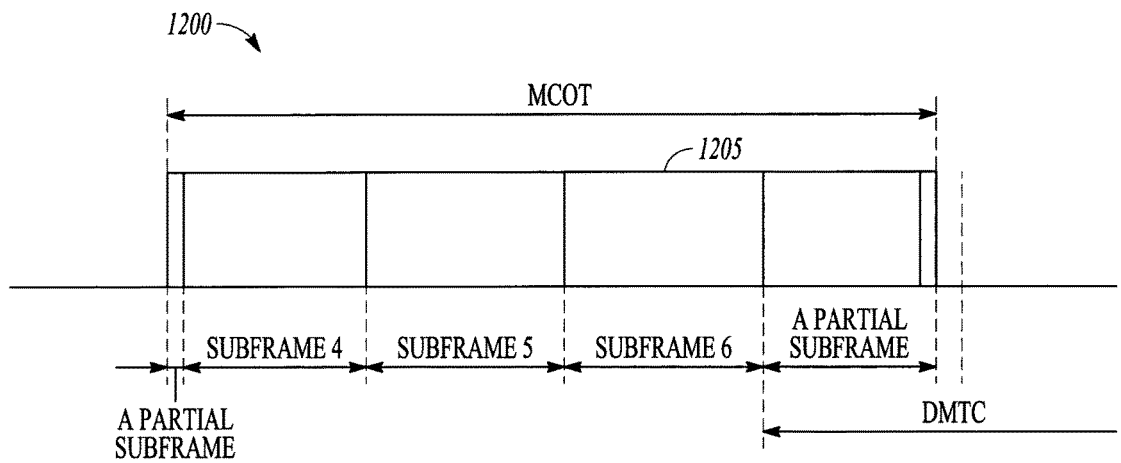
FIG. 12 is a timing diagram illustrating inclusion of a discovery reference signal in a partial subframe according to an example embodiment.

FIG. 12 is a timing diagram illustrating a DL transmission generally at 1200 in a second method. The DRS is transmitted in the last subframe 1205 if its length is at least 12 orthogonal frequency division multiplexing (OFDM) symbols. If the length of the last subframe 1205 is less than 12 OFDM symbols, the DRS is not allowed to be transmitted in this subframe and a new LBT will be performed before the next following subframe for the DRS transmission similarly to that shown in FIG. 11. As the LAA DRS consists of 12 OFDM symbols, the total duration of the DL transmission burst including the DRS transmission in the last subframe of the burst, if it exists, would not exceed the MCOT limit.

Figure 13:
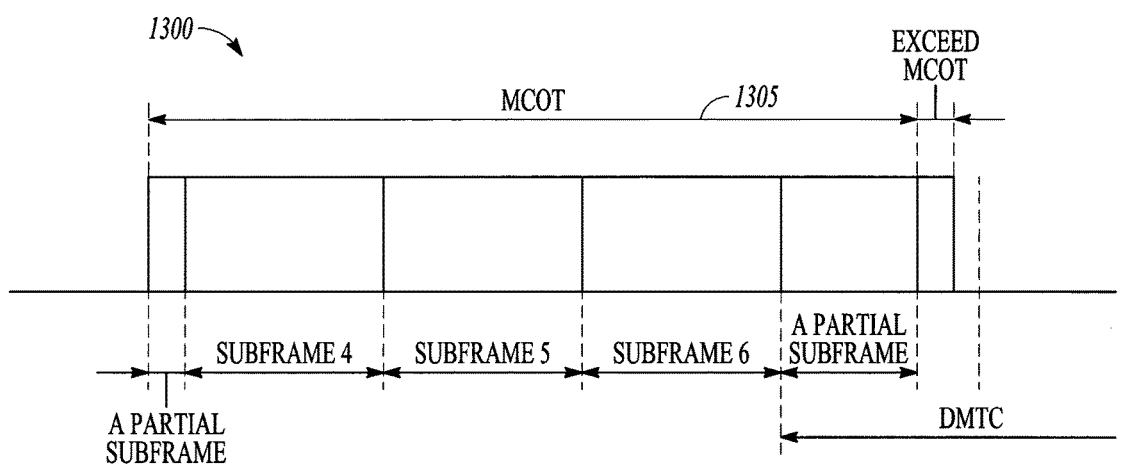
FIG. 13 is a timing diagram illustrating inclusion of a discovery reference signal in a partial subframe according to an example embodiment.

FIG. 13 is a timing diagram illustrating a DL transmission at 1300 where the DRS is allowed to be transmitted in the last subframe regardless of the length of the last subframe. In this example, it is possible that the total duration of the DL burst 1300, including the following appended DRS transmission exceeds the MCOT 1305 limit. Note that the DRS can be considered as a short control signal which can be transmitted without LBT, at least in regions such as Europe and the US. Although the DRS immediately follows the DL transmission burst, the DRS transmission may be considered as a separate transmission from the DL burst.

Figure 14:
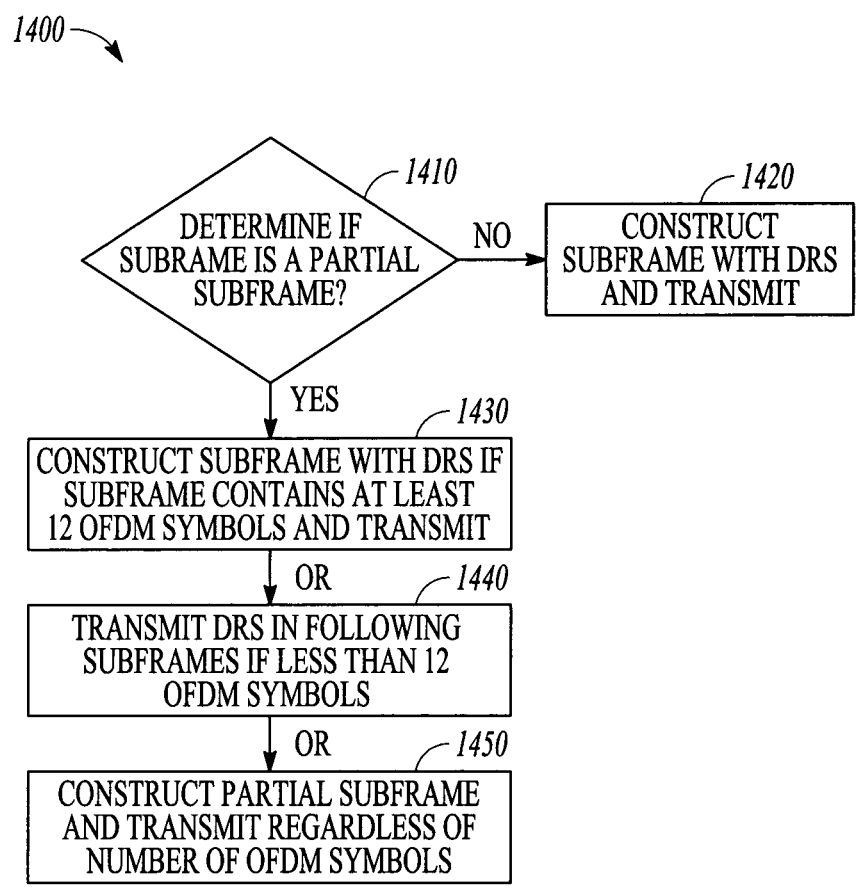
FIG. 14 is a flowchart illustrating a method of including a discovery reference signal in subframes according to an example embodiment.

FIG. 14 is a flowchart illustrating a method 1400 performed by an evolved node B (eNB) for license assisted access (LAA) communications. The method 1400 includes determining if a subframe to be transmitted is a partial subframe at 1410. If the subframe is not a partial subframe, the subframe is constructed at 1420 to contain a discovery reference signal (DRS) for transmission. The subframe is constructed without the DRS in one embodiment when the subframe is a partial subframe. When the subframe is a partial subframe with at least 12 OFDM symbols, the DRS is included in the subframe at 1430. The DRS is transmitted in following subframes at 1440 within the DMTC when the subframe is a partial subframe with less than 12 OFDM symbols.

In one embodiment, the subframe is constructed with the DRS when the subframe is a partial subframe. The partial subframe constructed with the DRS at 1450 is transmitted regardless of the number of OFDM symbols in the partial subframe, treating the DRS as a short control signal.

Figure 15:
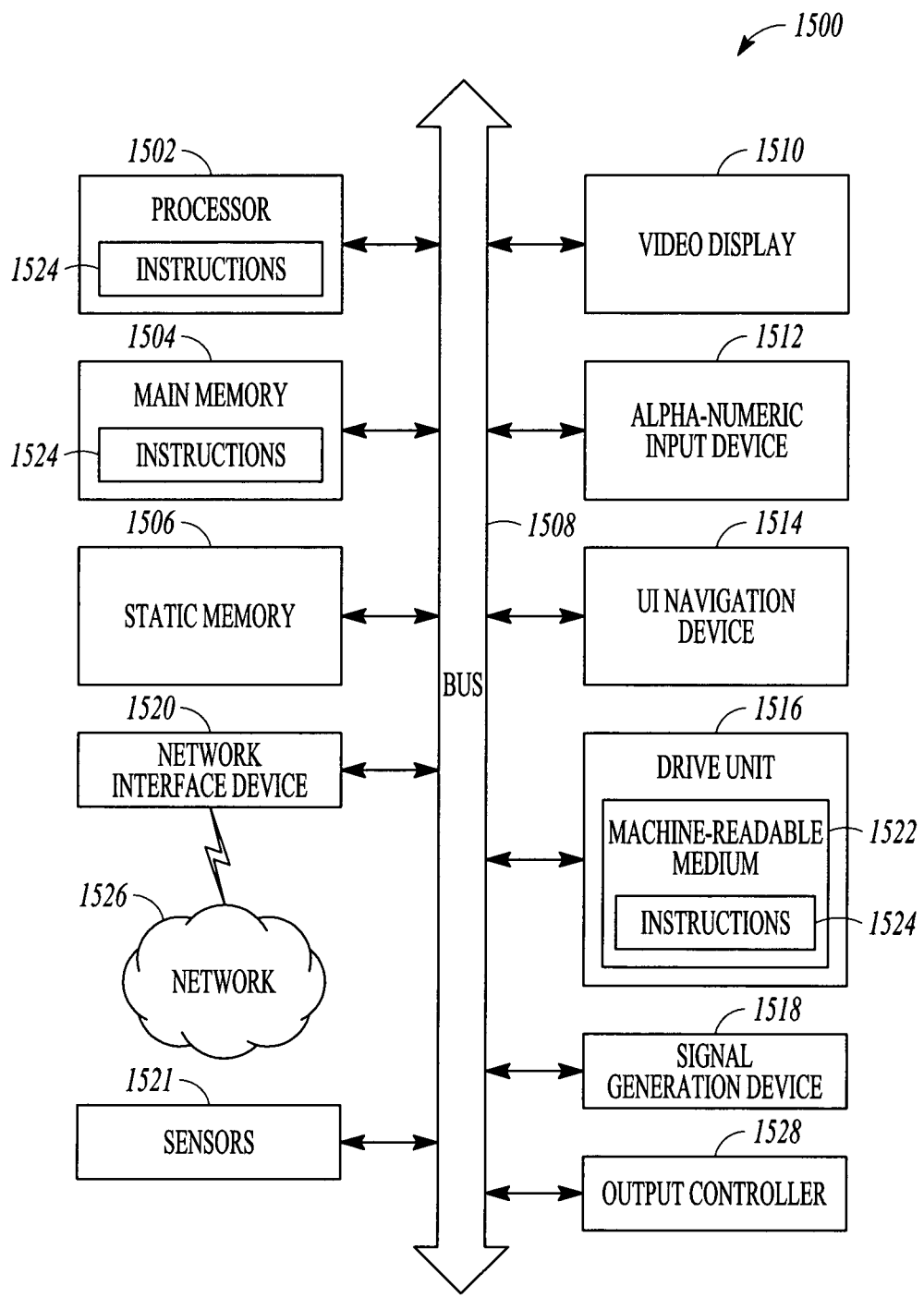
FIG. 15 is a block diagram of an example machine upon which any one or more of the techniques (e.g., methodologies) discussed herein may be performed according to an example embodiment.

FIG. 15 illustrates a block diagram of an example machine 1500 upon which any one or more of the techniques (e.g., methodologies) discussed herein may perform. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a cellular device, such as user equipment (UE), a cell tower device, commonly referred to as an eNodeB, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a computer readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a computer readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute computer readable media.

While the computer readable medium 1522 is illustrated as a single medium, the term "computer readable medium" may include a single medium or multiple media (e.g., a centralized or distributed database, and/or associated caches and servers) configured to store the one or more instructions 1524.

When the machine operates as a UE, the computer readable medium 1522 can instruct one or more processors of the UE to receive a partial subframe containing at least one synchronization signal; determine symbols contained in the receive partial subframe; extract the at least one synchronization signal from the partial subframe; and use the extracted synchronization signal to gain access to a channel in an unlicensed frequency. As described earlier herein, a subframe can comprise fourteen symbols identified as symbols #0 to #13. A primary synchronization signal can have a fixed position at symbol #5 and a secondary synchronization signal can have a fixed position at symbol #6. The synchronization signals can be received in subframes 0 and 5 of a frame. In some embodiments, the received subframe can contain at least one synchronization signal as a function of whether or not a corresponding symbol is available in the partial subframe. In some embodiments, the received partial subframe can contain both synchronization signals. For example, in some embodiments, if the received partial subframe starts at symbol #5 or earlier, the subframe can contain both synchronization signals. Other example starting symbols can be contemplated, for example, in some embodiments, if the received partial subframe starts at symbol #6 or earlier, the subframe can contain the secondary synchronization signal. Further, if a subframe ends at symbol #6 or later, the subframe can contain both synchronization signals. Other starting symbols or ending symbols can define whether one or both of the primary and secondary synchronization signal are included, and embodiments are not limited in that regard.

When the machine operates as an eNB, the computer readable medium 1522 can instruct one or more processors of the eNB to determine if a subframe to be transmitted is a partial subframe; and if the subframe is not a partial subframe, construct the subframe to contain both a primary synchronization signal (PSS) and a secondary synchronization signal (SSS) at fixed symbol positions within the subframe. The computer readable medium 1522 can instruct one or more processors of the eNB to perform any of the other operations described herein.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. In some examples, the network interface device 1520 may wirelessly communicate using Multiple User MIMO techniques. The term "transmission medium" shall be taken to include any intangible medium that is capable of storing, encoding or carrying instructions for execution by the machine 1500, and includes digital or analog communications signals or other intangible medium to facilitate communication of such software.

Apparatuses for Performing Various Embodiments

Figure 16:
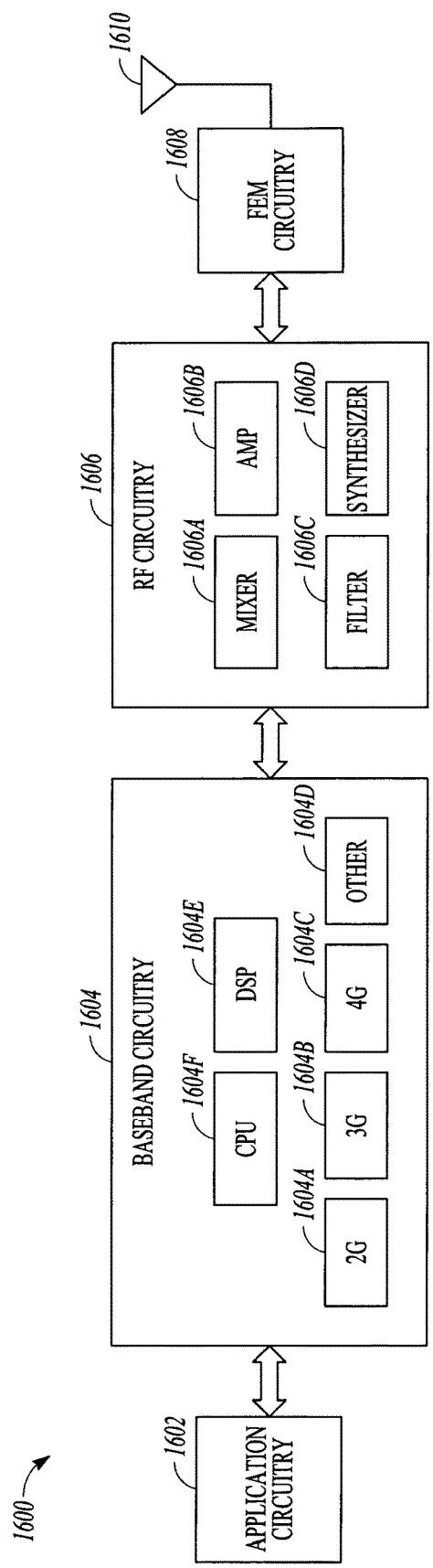
FIG. 16 is a functional diagram of a User Equipment (UE) in accordance with some embodiments.

FIG. 16 is a functional diagram of a User Equipment (UE) 1600 in accordance with some embodiments. The UE 1600 may be suitable for use as a UE 101 as depicted in FIG. 1. In some embodiments, the UE 1600 may include application circuitry 1602, baseband circuitry 1604, Radio Frequency (RF) circuitry 1606, front-end module (FEM) circuitry 1608 and one or more antennas 1610, coupled together at least as shown. In some embodiments, other circuitry or arrangements may include one or more elements and/or components of the application circuitry 1602, the baseband circuitry 1604, the RF circuitry 1606 and/or the FEM circuitry 1608, and may also include other elements and/or components in some cases. As an example, "processing circuitry" may include one or more elements and/or components, some or all of which may be included in the application circuitry 1602 and/or the baseband circuitry 1604. As another example, "transceiver circuitry" may include one or more elements and/or components, some or all of which may be included in the RF circuitry 1606 and/or the FEM circuitry 1608. These examples are not limiting, however, as the processing circuitry and/or the transceiver circuitry may also include other elements and/or components in some cases.

In embodiments, the processing circuitry can configure the transceiver circuitry to receive, from an eNB (e.g., eNB 15), a partial subframe containing at least one synchronization signal, and to to determine symbols contained in the receive partial subframe.

The processing circuitry can configure the transceiver circuitry to extract at least one synchronization signal from the partial subframe, and to use the extracted synchronization signal to gain access to a channel in an unlicensed frequency.

In some embodiments, a subframe comprises fourteen symbols identified as symbols #0 to #13, although embodiments are not limited to any particular number of symbols. In some embodiments, a primary synchronization signal can have a fixed position at symbol #5 and a secondary synchronization signal can have a fixed position at symbol #6. In some embodiments, the synchronization signals can be transmitted in subframes 0 and 5 of a frame. In some embodiments, the received subframe can contain at least one synchronization signal as a function of whether or not a corresponding symbol is available in the partial subframe.

In some embodiments, the received partial subframe can include or contain both synchronization signals. In some embodiments, if the received partial subframe starts at symbol #5 or earlier, the subframe can contain both synchronization signals. In some embodiments, if the received partial subframe starts at symbol #6 or earlier, the subframe can contain the secondary synchronization signal. In some embodiments, if a subframe ends at symbol #6 or later, the subframe can contain or include both synchronization signals. In some embodiments, if a subframe ends at symbol #5 the subframe can contain the primary synchronization signal. It will be appreciated that whether a partial subframe includes a particular synchronization signal can be based on other criteria, and other symbol numbers than those described herein. Embodiments are not limited to any particular starting symbol number for determining contents of a partial subframe.

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1604 may include circuitry such as, but not limited to, one or more single-core or multi-core processors. The baseband circuitry 1604 may include one or more baseband processors and/or control logic to process baseband signals received from a receive signal path of the RF circuitry 1606 and to generate baseband signals for a transmit signal path of the RF circuitry 1606. Baseband circuitry 1604 may interface with the application circuitry 1602 for generation and processing of the baseband signals and for controlling operations of the RF circuitry 1606. For example, in some embodiments, the baseband circuitry 1604 may include a second generation (2G) baseband processor 1604a, third generation (3G) baseband processor 1604b, fourth generation (4G) baseband processor 1604c, and/or other baseband processor(s) 1604d for other existing generations, generations in development or to be developed in the future (e.g., fifth generation (5G), 6G, etc.). The baseband circuitry 1604 (e.g., one or more of baseband processors 1604a-d) may handle various radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, and/or constellation mapping/demapping functionality. In some embodiments, encoding/decoding circuitry of the baseband circuitry 1604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1604e of the baseband circuitry 1604 may be configured to run elements of the protocol stack for signaling of the PHY, MAC, RLC, PDCP and/or RRC layers. In some embodiments, the baseband circuitry may include one or more audio digital signal processor(s) (DSP) 1604f. The audio DSP(s) 1604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606a, amplifier circuitry 1606b and filter circuitry 1606c. The transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect. In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c. The filter circuitry 1606c may include a low-pass filter (LPF), although the scope of the embodiments is not limited in this respect.

In some embodiments, the mixer circuitry 1606a of the receive signal path and the mixer circuitry 1606a of the transmit signal path may include two or more mixers and may be arranged for quadrature downconversion and/or upconversion respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and/or direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606. In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider. The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer. In some embodiments, frequency input may be provided by a voltage-controlled oscillator (VCO), although that is not a requirement. Divider control input may be provided by either the baseband circuitry 1604 or the application circuitry 1602 depending on the desired output frequency. In some embodiments, a divider control input (e.g., N) may be determined from a look-up table based on a channel indicated by the application circuitry 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610. In some embodiments, the UE 1600 may include additional elements such as, for example, memory/storage, display, camera, sensor, and/or input/output (I/O) interface.

Figure 17:
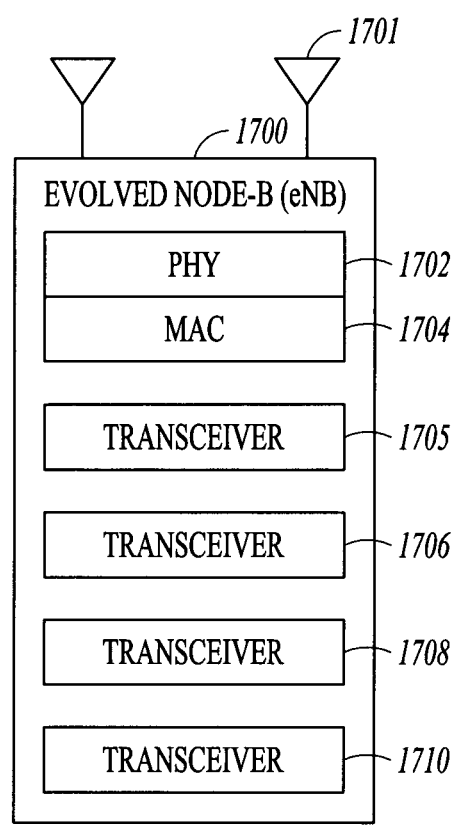
FIG. 17 is a functional diagram of an Evolved Node-B (eNB) in accordance with some embodiments.

FIG. 17 is a functional diagram of an Evolved Node-B (eNB) 1000 in accordance with some embodiments. It should be noted that in some embodiments, the eNB 1700 may be a stationary non-mobile device. The eNB 1700 may be suitable for use as an eNB 150 as depicted in FIG. 1. The eNB 1700 may include physical layer circuitry 1702 and a transceiver 1705, one or both of which may enable transmission and reception of signals to and from the UE 1600, other eNBs, other UEs or other devices using one or more antennas 1701. As an example, the physical layer circuitry 1702 may perform various encoding and decoding functions that may include formation of baseband signals for transmission and decoding of received signals. As another example, the transceiver 1705 may perform various transmission and reception functions such as conversion of signals between a baseband range and a Radio Frequency (RF) range. Accordingly, the physical layer circuitry 1702 and the transceiver 1705 may be separate components or may be part of a combined component. In addition, some of the functionality described may be performed by a combination that may include one, any or all of the physical layer circuitry 1702, the transceiver 1705, and other components or layers.

In some embodiments, the transceiver 1705 can determine if a subframe to be transmitted is a partial subframe. If the subframe is not a partial subframe, the transceiver 1705 can construct the subframe to contain both a PSS and an SSS at fixed symbol positions within the subframe. If the subframe is a partial subframe, the subframe can be constructed without the synchronization signals.

The eNB 1700 may also include medium access control layer (MAC) circuitry 1704 for controlling access to the wireless medium. The antennas 1610, 1701 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 1610, 1701 may be effectively separated to take advantage of spatial diversity and the different channel characteristics that may result. In FD MIMO embodiments, a two-dimensional planar antenna array structure may be used, and the antenna elements are placed in the vertical and horizontal direction as described earlier herein.

In some embodiments, the UE 1600 or the eNB 1700 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 1600 or eNB 1700 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 1600, eNB 1700 or other device may include one or more of a keyboard, a display, a non-volatile memory port, multiple antennas, a graphics processor, an application processor, speakers, and other mobile device elements. The display may be an LCD screen including a touch screen.

To better illustrate the apparatuses, systems, and methods disclosed herein, a non-limiting list of examples is provided herein:

In Example 1, an apparatus for a user equipment (UE), the apparatus comprising transceiver circuitry and hardware processing circuitry, the hardware processing circuitry to configure the transceiver circuitry to receive, from an Evolved Node-B (eNB), a partial subframe containing at least one synchronization signal; determine symbols contained in the receive partial subframe; extract the at least one synchronization signal from the partial subframe; use the extracted synchronization signal to gain access to a channel in an unlicensed frequency; and transmit on the channel.

In Example 2, the subject matter of Example 1 can optionally include wherein a subframe comprises fourteen symbols identified as symbols #0 to #13 and wherein a primary synchronization signal has a fixed position at symbol #5 and a secondary synchronization signal has a fixed position at symbol #6, and wherein synchronization signals are received in subframes 0 and 5 of a frame.

In Example 3, the subject matter of any of Examples 1-2 can optionally include wherein the received subframe contains at least one synchronization signal as a function of whether or not a corresponding symbol is available in the partial subframe.

In Example 4, the subject matter of any of Examples 1-3 can optionally include wherein the received partial subframe contains either both a primary synchronization signal and a secondary synchronization signal or no synchronization signals, based on whether a corresponding symbol is available in the partial subframe.

In Example 5, the subject matter of any of Examples 1-4 can optionally include wherein if the received partial subframe starts at symbol #5 or earlier, the subframe contains both a primary synchronization signal and a secondary synchronization signal, if the received partial subframe starts at symbol #6 or earlier, the subframe contains a secondary synchronization signal, if a subframe ends at symbol #6 or later, the subframe contains both the primary synchronization signal and the secondary synchronization signal, and if a subframe ends at symbol #5 the subframe contains the primary synchronization signal.

In Example 6, the subject matter of any of Examples 1-5 can optionally include wherein the hardware processing circuitry includes a baseband processor to process downlink control channels.

In Example 7, a computer-readable medium stores instructions for execution by one or more processors to perform operations for communication by a user equipment (UE), the operations to configure the one or more processors to receive a partial subframe containing at least one synchronization signal; determine symbols contained in the receive partial subframe; extract the at least one synchronization signal from the partial subframe; and use the extracted synchronization signal to gain access to a channel in an unlicensed frequency.

In Example 8, the subject matter of Example 7 can optionally include wherein a subframe comprises fourteen symbols identified as symbols #0 to #13 and wherein a primary synchronization signal (PSS) has a fixed position at symbol #5 and a secondary synchronization signal (SSS) has a fixed position at symbol #6, and wherein synchronization signals are received in subframes 0 and 5 of a frame.

In Example 9, the subject matter of any of Examples 7-8 can optionally include wherein the received subframe contains at least one synchronization signal as a function of whether or not a corresponding symbol is available in the partial subframe.

In Example 10, the subject matter of any of Examples 7-9 can optionally include wherein the received partial subframe contains both the PSS and the SSS.

In Example 11, the subject matter of any of Examples 7-10 can optionally include wherein if the received partial subframe starts at symbol #5 or earlier, the subframe contains both the PSS and the SSS.

In Example 12, the subject matter of any of Examples 7-11 can optionally include wherein if the received partial subframe starts at symbol #6 or earlier, the subframe contains the SSS.

In Example 13, the subject matter of any of Examples 7-12 can optionally include wherein if a subframe ends at symbol #6 or later, the subframe contains both the PSS and the SSS.

In Example 14, the subject matter of any of Examples 7-13 can optionally include wherein if a subframe ends at symbol #5 the subframe contains the PSS.

In Example 15, a computer readable medium that stores instructions for execution by one or more processors to perform operations for communication by an Evolved Node-B (eNB), the operations to configure the one or more processors to determine if a subframe to be transmitted is a partial subframe; and if the subframe is not a partial subframe, construct the subframe to contain both a primary synchronization signal (PSS) and a secondary synchronization signal (SSS) at fixed symbol positions within the subframe.

In Example 16, the subject matter of Example 15 can optionally include wherein if the subframe is a partial subframe, the subframe is constructed without synchronization signals.

In Example 17, the subject matter of any of Examples 15-16 can optionally include wherein a subframe comprises fourteen symbols identified as symbols #0 to #13.

In Example 18, the subject matter of any of Examples 15-17 can optionally include wherein the PSS has a fixed position at symbol #5 and the SSS has a fixed position at symbol #6.

In Example 19, the subject matter of any of Examples 15-18 can optionally include wherein synchronization signals are transmitted in subframes 0 and 5 of a frame.

In Example 20, the subject matter of any of Examples 15-19 can optionally include wherein if the subframe to be transmitted is a partial subframe, construct the subframe to contain at least one synchronization signal as a function of whether or not a corresponding symbol is available in the partial subframe.

In Example 21, the subject matter of any of Examples 15-20 can optionally include wherein the partial subframe is constructed with both the PSS and the SSS if the partial subframe contains both fixed symbol positions.

In Example 22, the subject matter of any of Examples 15-21 can optionally include wherein the partial subframe is constructed with one of the PSS and the SSS if the partial subframe contains only one of the fixed symbol positions.

In Example 23, the subject matter of any of Examples 15-22 can optionally include wherein the fixed symbol positions comprise a symbol #5 corresponding to the PSS and a symbol #6 corresponding to the SSS.

In Example 24, an apparatus for an Evolved Node-B (eNB), the apparatus comprising hardware processing circuitry and transceiver circuitry, the hardware processing circuitry to configure the transceiver circuitry to determine if a subframe to be transmitted is a partial subframe; and if the subframe is not a partial subframe, construct the subframe to contain both a primary synchronization signal (PSS) and a secondary synchronization signal (SSS) at fixed symbol positions within the subframe.

In Example 25, the subject matter of Example 24 can optionally include wherein if the subframe is a partial subframe, the subframe is constructed without the PSS and the SSS.

In various embodiments, methods, apparatus, non-transitory media, computer program products, or other implementations may be presented as example embodiments in accordance with the descriptions provided above. Certain embodiments may include UE such as phones, tablets, mobile computers, or other such devices. Some embodiments may be integrated circuit components of such devices, such as circuits implementing MAC and/or L1 processing on an integrated circuitry. In some embodiments, functionality may be on a single chip or multiple chips in an apparatus. Some such embodiments may further include transmit and receive circuitry on integrated or separate circuits, with antennas that are similarly integrated or separate structures of a device. Any such components or circuit elements may similarly apply to evolved node B embodiments described herein.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. An apparatus for an Evolved NodeB (eNodeB) configured for license assistance access (LAA) using carrier aggregation with a secondary cell (Scell) in an unlicensed spectrum, the apparatus comprising:
    memory; and
    processing circuitry coupled with the memory, the processing circuitry is configured to:
        encode one or more consecutive subframes for a downlink transmission within the Scell, wherein the downlink transmission is to occupy the one or more consecutive subframes and is to start within a first subframe and is to end with a last subframe, the last subframe either fully occupied or following a downlink pilot time slot (DwPTS) duration;
        for non-empty subframes of the one or more consecutive subframes of the downlink transmission that are located at predetermined positions in a frame and include at least a predetermined number of Orthogonal Frequency Division Multiplexing (OFDM) symbols, encode the subframes to include both a primary synchronization signal (PSS) and a secondary synchronization signal (SSS) at fixed positions of the subframes; and
        refrain from encoding other subframes of the one or more consecutive subframes of the downlink transmission to include the PSS and the SSS.

2. The apparatus of claim 1, wherein a frame includes 20 slots identified as slots 0 to 19, wherein each of the one or more consecutive subframes comprise two slots of a frame, and wherein the processing circuitry is to configure the eNodeB to only transmit the PSS and SSS in slots 0 and 10 corresponding to the non-empty subframes that include at least the predetermined number of OFDM symbols.

3. The apparatus of claim 2, wherein for the non-empty subframes that are encoded to include the PSS and the SSS, the PSS has a fixed position at the last OFDM symbol in slots 0 and 10 of the frame, and the SSS has a fixed position immediately before the PSS.

4. The apparatus of claim 1, wherein a frame includes 10 subframes which have positions in the frame that are identified as subframes 0 to 9, and wherein the processing circuitry is to configure the eNodeB to transmit the PSS and SSS only in non-empty subframes having predetermined positions identified as subframes 0 and 5.

5. The apparatus of claim 4, wherein a subframe comprises fourteen symbols identified as symbols #0 to #13, and the PSS has a fixed position at symbol #6 in subframes 0 and 5 and the SSS has a fixed position at symbol #5 in subframes 0 and 5.

6. The apparatus of claim 1, wherein the predetermined number of the OFDM symbols is 12.

7. The apparatus of claim 1, wherein if the PSS is a part of a discovery signal (DS), the processing circuitry is to encode the PSS in a last OFDM symbol of a first slot of a DS occasion which has a duration of 12 OFDM symbols within one of the non-empty subframes.

8. The apparatus of claim 7, wherein the processing circuitry is to configure the eNodeB to transmit a DS within a DS occasion in any subframe within a discovery signal measurement timing configuration.

9. The apparatus of claim 7, wherein the processing circuitry is to configure the eNodeB to transmit a discovery signal simultaneously with any one of a Physical Downlink Share Channel (PDSCH), Physical Downlink Control Channel (PDCCH) or an Extended Physical Downlink Control Channel (EPDCCH) in subframes 0 and 5 of a frame.

10. The apparatus of claim 7, wherein the processing circuitry is to configure the eNodeB to refrain from transmitting a discovery signal simultaneously with any one of a Physical Downlink Share Channel (PDSCH), Physical Downlink Control Channel (PDCCH) or an Extended Physical Downlink Control Channel (EPDCCH) in subframes other than subframes 0 and 5 of a frame.

11. The apparatus of claim 1, wherein the processing circuitry is to aggregate component carriers (CC) to communicate with a user equipment (UE) in the unlicensed spectrum of the Scell, and is to communicate radio resource control (RRC) signaling with the UE using licensed spectrum of a primary cell (Pcell).

12. An apparatus for a user equipment (UE), the apparatus comprising:
    memory; and
    processing circuitry coupled with the memory, the processing circuitry is configured to: configure the UE to receive a downlink transmission from an evolved node B (eNodeB), wherein the UE and eNodeB are configured for license assistance access (LAA) using carrier aggregation with a secondary cell (Scell) in an unlicensed spectrum, and wherein the downlink transmission is to occupy one or more consecutive subframes, and is to start within a first subframe and is to end with a last subframe, the last subframe either fully occupied or following a downlink pilot time slot (DwPTS) duration;
        for non-empty subframes of the one or more consecutive subframes of the downlink transmission that are located at predetermined positions in a frame and include at least a predetermined number of Orthogonal Frequency Division Multiplexing (OFDM) symbols, extract a primary synchronization signal (PSS) and a secondary synchronization signal (SSS) from fixed positions of the subframes.

13. The apparatus of claim 12, wherein a frame includes 20 slots identified as slots 0 to 19, wherein each of the one or more consecutive subframes comprise two slots of a frame, and wherein the processing circuitry is to only extract the PSS and SSS from slots 0 and 10 corresponding to the non-empty subframes that include at least the predetermined number of OFDM symbols.

14. The apparatus of claim 13, wherein for the non-empty subframes include the PSS and the SSS, the PSS has a fixed position at the last OFDM symbol in slots 0 and 10 of the frame, and the SSS has a fixed position immediately before the PSS.

15. The apparatus of claim 12, wherein a frame includes 10 subframes which have positions in the frame that are identified as subframes 0 to 9, and wherein the processing circuitry is to extract the PSS and SSS only from non-empty subframes having predetermined positions identified as subframes 0 and 5.

16. The apparatus of claim 15, wherein a subframe comprises fourteen symbols identified as symbols #0 to #13, and the PSS has a fixed position at symbol #6 in subframes 0 and 5 and the SSS has a fixed position at symbol #5 in subframes 0 and 5.

17. The apparatus of claim 12, wherein the predetermined number of the OFDM symbols is 12.

18. The apparatus of claim 12, wherein if the PSS is a part of a discovery signal (DS), the processing circuitry is to extract the PSS from a last OFDM symbol of a first slot of a DS occasion which has a duration of 12 OFDM symbols within one of the non-empty subframes.

19. The apparatus of claim 18, wherein the processing circuitry is to encode the UE to receive the DS transmitted within a DS occasion in any subframe within a discovery signal measurement timing configuration.

20. The apparatus of claim 18, wherein the processing circuitry is to encode the UE to receive a discovery signal simultaneously with any one of a Physical Downlink Share Channel (PDSCH), Physical Downlink Control Channel (PDCCH) or an Extended Physical Downlink Control Channel (EPDCCH) in subframes 0 and 5 of a frame.

21. The apparatus of claim 18, wherein the processing circuitry is to encode the UE to refrain from receiving a discovery signal simultaneously with any one of a Physical Downlink Share Channel (PDSCH), Physical Downlink Control Channel (PDCCH) or an Extended Physical Downlink Control Channel (EPDCCH) in subframes other than subframes 0 and 5 of a frame.

22. The apparatus of claim 12, wherein the processing circuitry is to encode the UE to receive aggregated component carriers (CC) from the eNodeB in the unlicensed spectrum of the Scell, and to receive radio resource control (RRC) signaling from the eNodeB using licensed spectrum of a primary cell (Pcell).

23. A non-transitory computer-readable medium, having instructions stored thereon, which when performed by processing circuitry of an evolved Node B (eNodeB) cause following operations to be performed:
wherein the Evolved NodeB (eNodeB) is configured for license assistance access (LAA) using carrier aggregation with a secondary cell (Scell) in an unlicensed spectrum, and the operations comprises:
encoding one or more consecutive subframes for a downlink transmission within the Scell, wherein the downlink transmission is to occupy the one or more consecutive subframes and is to start within a first subframe and is to end with a last subframe, the last subframe either fully occupied or following a downlink pilot time slot (DwPTS) duration;
wherein a frame includes 10 subframes identified as subframes 0 to 9, the operations further comprises:
for a subframe of the one or more consecutive subframes of the downlink transmission that is neither a subframe 0 nor subframe 5 of a frame, refraining from encoding the subframe to include a primary synchronization signal (PSS) and a secondary synchronization signal (SSS); and
for a subframe of the one or more consecutive subframes of the downlink transmission that is either a subframe 0 or subframe 5 of a frame:
encoding the subframe to include both the PSS and SSS at fixed positions of the subframes, if the subframe is non-empty and includes at least a predetermined number of Orthogonal Frequency Division Multiplexing (OFDM) symbols; and
refraining from encoding the subframe to include the PSS and the SSS, if the subframe does not include at least the predetermined number of OFDM symbols.

24. The non-transitory computer-readable medium of claim 23, wherein the predetermined number of the OFDM symbols is 12.

25. A non-transitory computer-readable medium, having instructions stored thereon, which when performed by processing circuitry of a user equipment (UE) cause the UE to:
receive a downlink transmission from an evolved node B (eNodeB), wherein the UE and eNodeB are configured for license assistance access (LAA) using carrier aggregation with a secondary cell (Scell) in an unlicensed spectrum, and wherein the downlink transmission is to occupy one or more consecutive subframes, and is to start within a first subframe and is to end with a last subframe, the last subframe either fully occupied or following a downlink pilot time slot (DwPTS) duration;
wherein a frame includes 10 subframes identified as subframes 0 to 9, and for a subframe of the one or more consecutive subframes of the downlink transmission that is either a subframe 0 or subframe 5 of a frame, extract a primary synchronization signal (PSS) and a secondary synchronization signal (SSS) from fixed positions of the subframe, if the subframe is non-empty and includes at least 12 Orthogonal Frequency Division Multiplexing (OFDM) symbols.

* * * * *